United States Patent [19]

Jserng

[11] Patent Number: 5,397,151
[45] Date of Patent: Mar. 14, 1995

[54] RETRACTABLE LUGGAGE HANDLE MOUNTING ASSEMBLY

[76] Inventor: Yueh-Chy Jserng, No. 26-21, Hsi-Shih Chuang, Chang-Hua City, Taiwan, Prov. of China

[21] Appl. No.: 247,597

[22] Filed: May 23, 1994

[51] Int. Cl.6 ............................................. B62B 1/04
[52] U.S. Cl. ................................. 280/654; 280/655; 280/47.27; 280/47.315
[58] Field of Search ............... 280/652, 654, 655, 659, 280/47.18, , 47.24, 47.27, 47.315

[56] References Cited

U.S. PATENT DOCUMENTS

| | | | |
|---|---|---|---|
| 3,214,187 | 10/1965 | Fuerst | 280/654 |
| 3,998,476 | 12/1976 | Kazmark | 280/47.315 |
| 4,896,897 | 1/1990 | Wilhelm | 280/655 |
| 4,950,003 | 8/1990 | Holtz | 280/655 |
| 5,127,664 | 7/1992 | Cheng | 280/47.18 |
| 5,257,800 | 11/1993 | Yang | 280/655 |

Primary Examiner—Mitchell J. Hill
Assistant Examiner—Anne Marie Boehler
Attorney, Agent, or Firm—Morton J. Rosenberg; David I. Klein

[57] ABSTRACT

A retractable luggage handle mounting assembly including two sleeves, a top mounting frame and a bottom mounting frame fixed to a luggage to hold the sleeves, and a handle bar having two opposite ends coupled with a respective stop rod, each sleeve having a locating bushing and a neck portion at different elevations to limit the vertical moving range of the handle bar, the stop rod having a sloping surface portion near the top end, which fits into the tapered bottom opening of the respective locating bushing to hold the handle bar in the operative position when the handle bar is pulled out of the sleeves, and a spring supported steel ball near the bottom end which stops below the neck portion of either sleeve to retain the handle bar in the collapsed position.

1 Claim, 4 Drawing Sheets

RETRACTABLE LUGGAGE HANDLE MOUNTING ASSEMBLY

BACKGROUND OF THE INVENTION

The present invention relates to a retractable luggage handle mounting assembly which has means to retain the handle in the operative position or the collapsed position and, which can minimize the affect of tensile stress during its operation.

While traveling, one may have to carry a lot of clothes and personal things by luggage. A luggage commonly has a carrying handle for carrying by hand, and a retractable handle for moving on the ground. The retractable handle of a luggage may be concealed inside the luggage panels or disposed on the outside, generally comprised of two sleeves, a hand grip, two inner tubes joined by the hand grip and moved in and out of the sleeves. This structure of retractable handle can be pushed back into the sleeves to minimize the size when it is not in operation. However, when it is pulled out of the sleeves and set in the operative position, it may vibrate or move back inside the sleeves when the luggage is moved over an uneven road or obstacles.

SUMMARY OF THE INVENTION

The present invention provides a retractable luggage handle mounting assembly which eliminates the aforesaid problem. According to one aspect of the present invention, the retractable luggage handle mounting assembly is comprised of two sleeves having each a top end coupled with a respective locating bushing on the inside, a top mounting frame and a bottom mounting frame fixed to a luggage to hold the sleeves, and a handle bar having two opposite ends coupled with a respective stop rod, wherein the locating bushing has a tapered bottom opening; the stop rod has a tapered surface portion, which fits into the tapered bottom end of the locating bushing causing the handle bar retained firmly at the operative position when the handle bar is pulled out of the sleeves.

According to another aspect of the present invention, each sleeve has a neck portion near the bottom; the stop rod at either end of the handle bar has a collar in the middle, which is prohibited from passing the neck portion on either sleeve when the handle bar is collapsed, and a spring supported steel ball near the bottom end, which stops below the neck portion of either sleeve to retain the handle bar in the collapsed position.

DETAILED DESCRIPTION OF THE PREFERRED EMBODIMENT

Figure 1:
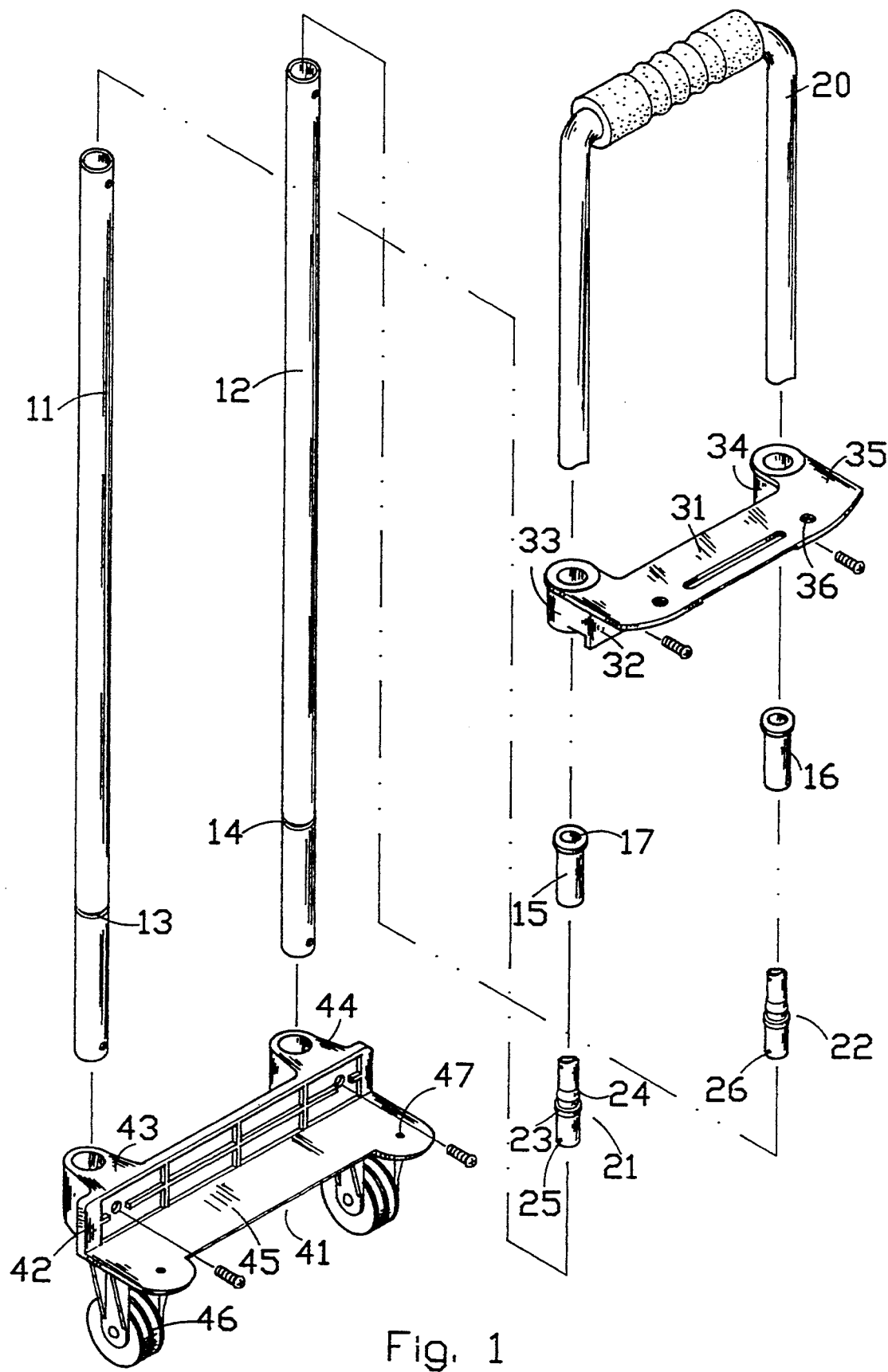
FIG. 1 is an exploded view of a retractable luggage handle mounting assembly according to the present invention.
Figure 2:
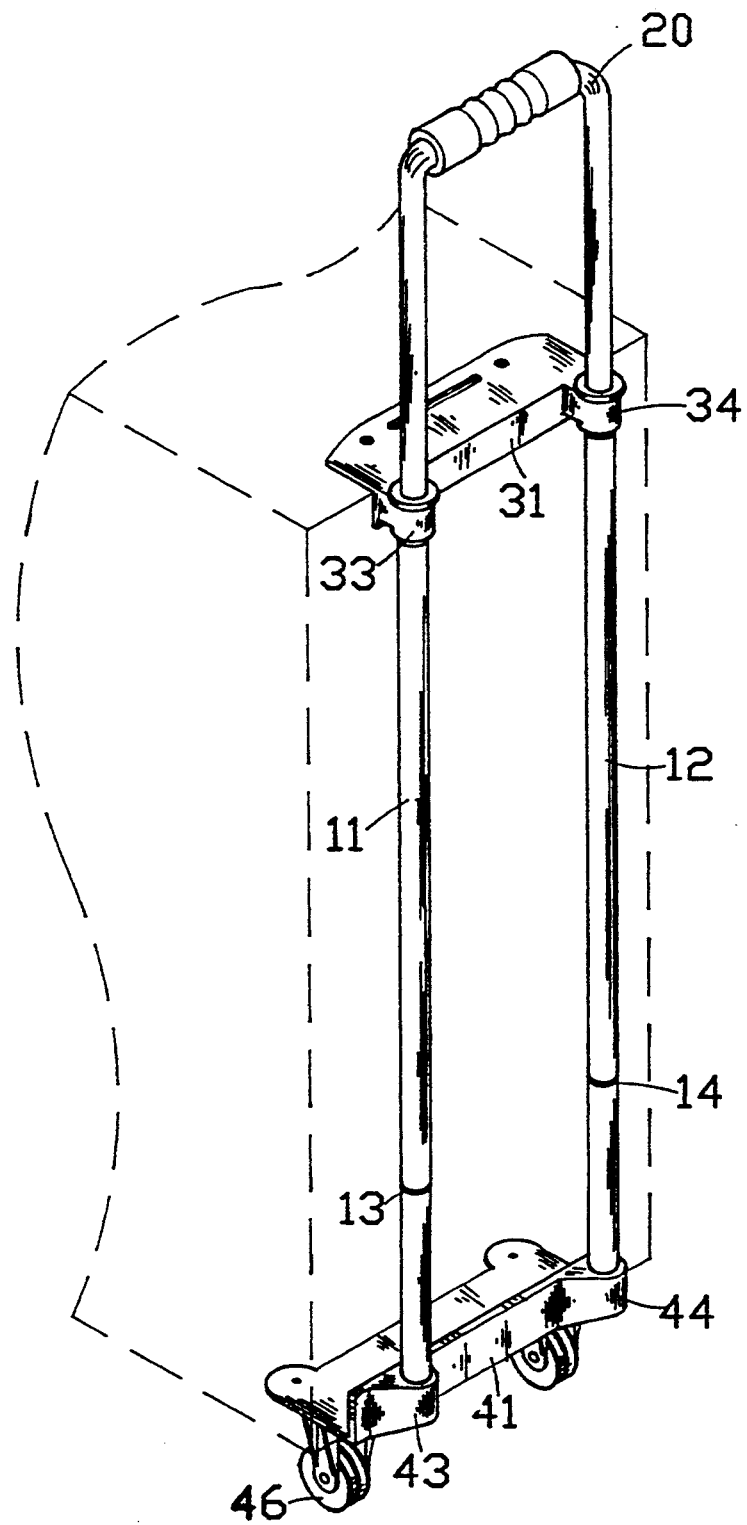
FIG. 2 is an installed view showing the retractable luggage handle mounting assembly fastened to a luggage.

Referring to FIGS. 1 and 2, the present invention includes two units, namely, the retractable luggage handle and the luggage handle mounting unit. The retractable luggage handle comprises two sleeves 11 and 12 and a substantially U-shaped handle bar 20. The sleeve 11 or 12 has a neck portion 13 or 14 near the bottom end. The top end of the sleeve 11 or 12 is mounted with a locating bushing 15 or 16 on the inside. The locating bushing 15 or 16 fits into the top end of the sleeve 11 or 12, having an outward top flange 17 at one end stopped outside the top end of the sleeve 11 or 12. The bottom end of the inner diameter of the locating bushing 15 or 16 is made gradually bigger toward the bottom (see FIG. 3). The handle bar 20 has two opposite ends respectively inserted into either sleeve 11 or 12 and coupled with a respective stop rod 21 or 22. The stop rod 21 or 22 has a collar 23 in the middle, which is prohibited from passing through the neck portion 13 or 14 of the sleeve 11 or 12, a spring-supported steel ball 25 or 26 fastened to and projecting out of a radial hole thereof near the bottom end. The upper part of the stop rod 21 or 22 has a sloping surface portion 24 disposed outside the handle bar 20. When the handle bar 20 is pulled out of the sleeves 11 and 12, the sloping surface portion 24 of the stop rod 21 or 22 fits into the bottom end of the locating bushing 15 or 16 to stop the handle bar 20 in the operative position.

Figure 3:
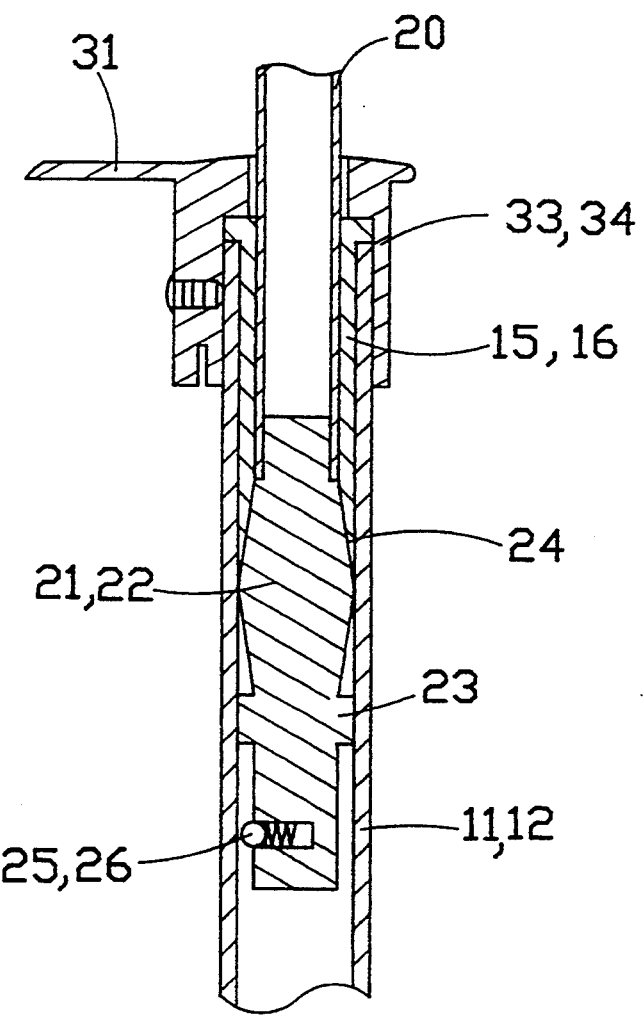
FIG. 3 is a partial view in section of the retractable luggage handle mounting assembly of the present invention, showing the handle bar retained in the operative position.

The luggage handle mounting unit includes a top mounting frame 31 and a bottom mounting frame 41. The top mounting frame 31 comprises a vertical mounting plate 32 and a horizontal mounting plate 35 connected at right angles. The vertical mounting plate 32 of the top mounting frame 31 comprises two vertical barrels 33 and 34 at two opposite ends, which receive the top end of either sleeve 11 or 12. As shown in FIG. 3, the top end of the sleeve 11 or 12 is fixed inside the vertical barrel 33 or 34 by a tie screw. The horizontal mounting plate 35 of the top mounting frame 31 has two mounting holes 36 for fastening to the top panel of the luggage by fastening devices (see FIG. 2). The bottom mounting frame 41 comprises a vertical mounting plate 42 and a horizontal mounting plate 45 connected at right angles. The vertical mounting plate 42 of the bottom mounting frame 41 comprises two vertical sockets 43 and 44 at two opposite ends, which receive the bottom end of either sleeve 11 or 12. When the bottom end of the sleeve 11 or 12 is inserted into either vertical socket 43 or 44, it is fixed in place by a tie screw. The horizontal mounting plate 45 of the bottom mounting frame 41 has mounting holes 47 for fastening to the bottom panel of the luggage by fastening devices (see FIG. 2) and, is provided with wheels 46 at the bottom.

Referring to FIGS. 1 and 2 again, during the assembly process, the two opposite ends of the substantially U-shaped handle bar 20 are respectively inserted through the barrels 33 and 34 of the top mounting frame 31, then the locating bushings 15 and 16 are respectively sleeved onto the two opposite ends of the handle bar 20, and then the stop rods 21 and 22 are respectively fastened to either end of the handle bar 20, and then the two opposite ends of the handle bar 20 with the stop rods 21 and 22 are respectively inserted into the sleeves 11 and 12 from the top, and then the locating bushings 15 and 16 are respectively fixed to the top end of either sleeve 11 or 12. After the retractable luggage handle is assembled, the two opposite ends of the sleeves 11 and 12 are respectively fixed to the barrels 33 and 34 on the top mounting frame 31 and the sockets 43 and 44 on the bottom mounting frame 41. When the retractable luggage handle and the luggage handle mounting unit are connected, the top and bottom mounting frames 31 and 41 of the luggage handle mounting unit are fixed to the top and bottom panels of the luggage permitting the retractable luggage handle to be retained at one side panel of the luggage.

Referring to FIG. 3, when the handle bar 20 is extended out of the sleeves 11 and 12, the sloping surface portion 24 of the stop rod 21 or 22 fits into the bottom end of the locating bushing 15 or 16 to stop the handle bar 20 in the operative position. When the handle bar 20 is pulled to move the luggage, the connection between the locating bushing 15 or 16 and the stop rod 21 or 22 becomes more tight. When the handle bar 20 is pressed toward the sleeves 11 and 12, the stop rods 21 and 22 become disconnected from the locating bushings 15 and 16.

Figure 4:
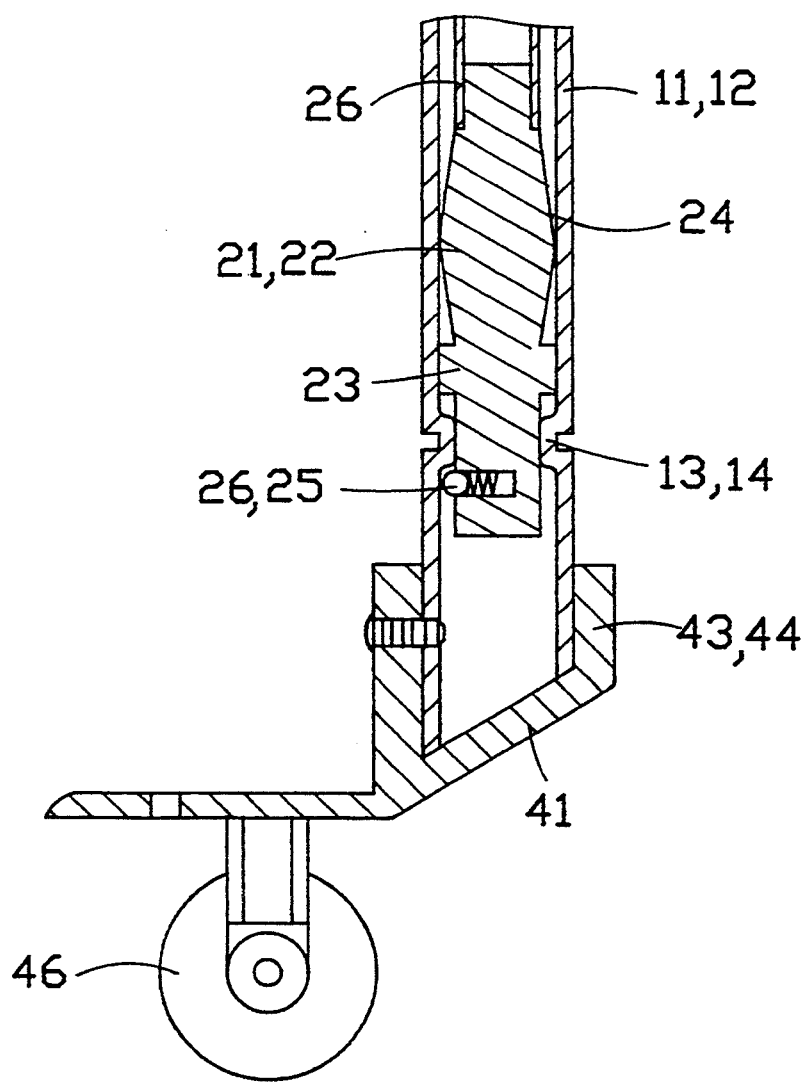
FIG. 4 is another partial view in section of the retractable luggage handle mounting assembly of the present invention, showing the handle bar retained in the collapsed position.

Referring to FIG. 4, when the handle bar 20 is pushed into the sleeves 11 and 12, the spring-supported steel ball 25 or 26 will be forced to pass over the neck portion 13 or 14, however the collar 23 will be stopped above the neck portion 13 or 14. When passed over the neck portion 13 or 14, the spring-supported steel ball 25 or 26 returns to its former position and stopped below the neck portion 13 or 14, thereby causing the retractable luggage handle retained in the collapsed position. By pulling the handle bar 20 outwards from the sleeves 11 and 12, the spring-supported steel ball 25 or 26 will be forced back inside the bottom end of the stop rod 21 or 22, permitting the two opposite ends of the handle bar 20 to be extended out of the sleeves 11 and 12 and set into the operative position.

It is claimed:

1. A retractable luggage handle mounting assembly comprising:

a top mounting frame including a vertical mounting plate and a horizontal mounting plate extended downward from said vertical mounting plate of said top mounting frame, said vertical mounting plate of said top mounting frame comprising two spaced barrels, a bottom mounting frame including a horizontal mounting plate having a bottom provided with wheel means, and a vertical mounting plate extended upward from said horizontal mounting plate of said bottom mounting frame, said vertical mounting plate of said bottom mounting frame comprising two spaced sockets aligned with said barrels respectively;

two sleeves engaged between said barrels and said sockets respectively, each of said sleeves including a top end fixed to said barrels, a bottom end fixed to said sockets, and a neck portion provided close to said bottom end, two locating bushings fixed on top of said sleeves respectively and each including a bottom having a tapered orifice formed therein, said tapered orifices having a gradually larger inner diameter toward said bottom;

a substantially U-shaped handle bar including two opposite ends respectively inserted through said barrels and said locating bushings and engaged into said sleeves; two stop rods fixed to said ends of said handle bar and each including a top end, a middle and a bottom end, at least one of said stop rods including a collar formed in said middle, a sloping surface portion formed in said top end for engaging with said tapered orifices of said locating bushings, and a radial hole near said bottom end, a spring and a ball disposed in said radial hole, said ball being forced by said spring and partially projected out of said radial hole, said collar being engaged below said locating bushing when said handle bar is extended out of said sleeves and engaged above said neck portion when said handle bar is pushed into said sleeves, said ball being forced to pass over said neck portion and stopped therebelow when said collar is stopped above said neck portion.

* * * * *